United States Patent
Zickell et al.

(10) Patent No.: US 6,531,200 B2
(45) Date of Patent: *Mar. 11, 2003

(54) ROOFING MATERIAL WITH ENCAPSULATED FIBROUS MAT

(75) Inventors: Thomas Zickell, Stratham, NH (US); James Karlis, Pelham, NH (US); Charles Diamon, Billerica, MA (US)

(73) Assignee: Northern Elastomeric, Inc., Brentwood, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/315,281

(22) Filed: May 20, 1999

(65) Prior Publication Data

US 2002/0061379 A1 May 23, 2002

Related U.S. Application Data

(63) Continuation-in-part of application No. 09/106,241, filed on Jun. 29, 1998, now Pat. No. 6,296,912.

(51) Int. Cl.[7] .................................................. B32B 7/04
(52) U.S. Cl. .......................... 428/40.1; 52/408; 52/409; 52/411; 52/445; 52/446; 52/746.11; 428/40.2; 428/40.3; 428/143; 428/144; 428/147; 428/489
(58) Field of Search .............................. 428/40.1, 40.2, 428/40.3, 143, 147, 144, 489; 52/411, 408, 409, 445, 446, 746.11

(56) References Cited

U.S. PATENT DOCUMENTS

| | | | | | |
|---|---|---|---|---|---|
| 5,206,068 A | * | 4/1993 | Kalkanoglu | .................. | 428/143 |
| 5,848,510 A | * | 12/1998 | Grazman | ...................... | 52/411 |
| 6,120,838 A | * | 9/2000 | Zickell | ........................ | 427/186 |
| 6,296,912 B1 | * | 10/2001 | Zickell | ....................... | 428/40.1 |

* cited by examiner

*Primary Examiner*—Nasser Ahmad
(74) *Attorney, Agent, or Firm*—Bourque & Associates, PA

(57) ABSTRACT

A roofing membrane material is disclosed. The material is characterized in that it includes a woven or non-woven fibrous mat encapsulated within a non-adhesive asphalt coating, the resulting encapsulated mat having an adhesive asphalt layer applied to one surface thereof. An acrylic coating is applied to the surface of the encapsulated mat that is not in contact with the adhesive asphalt layer. The resulting membrane, when applied to a roofing deck, provides a high traction surface that will not adhere to shingles and provides an effective waterproofing seal on the roofing deck.

20 Claims, 4 Drawing Sheets

ROOFING MATERIAL WITH ENCAPSULATED FIBROUS MAT

RELATED APPLICATION

This is a request for a continuation-in-part application under 37 C.F.R. §1.53(b) of application Ser. No. 09/106,241, filed on Jun. 29, 1998, now U.S. Pat. No. 6,296,912 entitled ROOFING MATERIAL WITH FIBROUS MAT.

FIELD OF THE INVENTION

The present invention is in the field of roofing materials. More particularly, the present invention is in the field of roofing membrane materials incorporating a fibrous mat to provide traction to roofing installers during construction of the roof.

BACKGROUND OF THE INVENTION

Asphalt based roofing shingles are presently installed on approximately eighty percent of the homes in the United States. In areas where snow accumulates, roof shingles can develop leaks as a result of ice dams which can form along the eaves of a roof. Ice dams form as the result of a differential temperature which occurs between the eaves of the roof and the interior sections of the roof. The temperature differential occurs when heat rises into the attic space. Under certain temperature conditions, snow collected on the roof surface will melt along the upper interior portions of the roof and then freeze when the liquid snow-melt reaches the cooler eave section of the roof. As can be seen in FIG. 1, the result is that a pool 1 of liquid water can form between the roof surface 2 and the ice dam 3. The ice dam 3 prevents the water from reaching the gutter 4 and draining away. Ultimately, the liquid water 1 can leak 5 through the roof surface 2, causing interior water damage to the structure. Ice dams can also occur as a result of frozen slush accumulating in gutters, also causing liquid to collect and leak through the roof.

In a typical roofing installation using asphalt shingles, an underlayer is first applied to the plywood deck of the roof. The underlayer may take the form of an asphalt saturated paper which is useful as a waterproofing member. Roofing shingles are applied on top of the underlayer with the seams of adjacent rows positioned in an offset relationship. In practice, a starter row or strip is begun at the roof eaves using self-sealing shingles. The end of the first shingle in the strip is trimmed such that, when it is placed on the deck, the cutouts of the first course of shingles will not be placed over the starter strip joints. The starter strip and the shingles are nailed to the eaves. Successive rows of shingles are then secured to the deck or roof using nails.

To ensure maximum protection against ice dams, membranes or metal flashing is installed wherever there is a possibility of icing, such as along the eaves of the roof. As noted above, ice dams are formed by the continual thawing and freezing of melting snow, or the backing up of frozen slush in gutters, which force water under the roofing, thereby causing damage to a structure's ceilings, walls, and insulation. The ice damming problem is most acute on lows-lope roofs; that is, roofs with a slope of two inches (5.08 cm) to four inches (10.16 cm) per foot (30.48 cm).

Traditional eaves flashing has either been 50-pound coated felt or two layers of 15-pound saturated felt cemented together. The term "pound" is defined as the weight of the felt required to cover an area of 108 square feet. Typically, the asphalt used in the fifty-pound felt is not modified with rubber, and after aging, will not form a good seal around nails. Additionally, the installation of two layers of 15-pound saturated felt consumes undesirable amounts of time and also will not seal around nails.

The use of self-adhesive products, such as ice and water protective membranes, has now become commonplace. A major problem with these products is that they are slippery, especially when wet or covered with frost. Slippery surfaces upon roofs create significant safety hazards for roofing installers, especially since such surfaces tend to be at least one story above ground level.

In an attempt to reduce the slippery nature of ice and water protective membranes, separate methods have been developed. In the first method, granules have been embedded in an asphaltic composition or in polyethylene sheeting which is either embossed or coated. When positioned on an upper surface of the membrane, the granules provide a high-traction surface upon which a roofing installer can walk. Such membranes also offer reinforcement and/or structural integrity, and allow lap sealing. Unfortunately, the granular surfaced materials suffer from disadvantages in that the granules cannot all be embedded into the asphalt material, thereby providing some degree of loose granules which can render the surface slippery. Additionally, since the granules roughen the membrane surface, it becomes necessary to cement overlaps in order to render them watertight. Finally, the granules add weight to the membrane which increases handling difficulties and freight costs associated with the membranes.

As for the membranes which employ polyethylene sheeting, the polyethylene surface tends to be quite slippery, thereby raising safety concerns. Furthermore, membranes which use polyethylene sheeting tend to be very flexible, rendering them hard to handle and apply.

In some applications, a problem has developed in which granular surfaced membranes have adhered to the overlying shingles. The roofing membranes described above are intended to be adhered to the underlying plywood of the roofing deck and not to the overlying shingles. If the membrane adheres to both the shingles and the roofing deck, removal of the shingles requires that the plywood decking be removed as well. This is very undesirable as it adds significant costs and complexity to the shingle repair.

Thus, a need exists for a membrane material which provides a highly non-slip surface, excellent lap sealing, structural integrity and lower weight. A need also exists for a membrane material which is resistant to adhering to the shingle portion of the roof.

SUMMARY OF THE INVENTION

The present invention relates to roofing membrane materials having a fibrous mat surface which provides traction, structural integrity and lap sealing capabilities. More particularly, the present invention relates to a roofing membrane material having an adhesive surface provided by an adhesive rubberized asphalt layer and non-adhesive surface provided by a woven or non-woven fibrous mat encapsulated within a non-adhesive asphalt coating. The adhesive rubberized asphalt layer is very adherent and provides excellent adhesion of the membrane to a roof deck, while the encapsulated fibrous mat provides a surface having excellent traction and lap sealing characteristics. An acrylic and low molecular weight polyethylene composite or other polymers that adhere to the asphalt and provide a non-slip surface may also be coated onto the non-adhesive surface to enhance its non-adhesive characteristics and provide traction. In one preferred embodiment, a layer of talc is applied to the acrylic layer to provide additional coverage of the asphalt. In another preferred embodiment, traction is further enhanced by providing granules of a particulate material embedded in the acrylic coating. The combination of the acrylic and the underlying non-adhesive asphalt prevent shingles from adhering to the membrane, while the material, with or without talc or granules, provides a high traction surface. The preferred material for forming the fibrous mat is fiberglass or polyester.

For preventing multiple layers of the membrane from adhering to one another during shipping and storage, a release sheet can be applied to the lower, adherent surface of the rubberized asphalt layer. As a result of the release sheet, when the membrane is rolled, or when several layers of the membrane are stacked together, the release sheet is interposed between the sticky lower surface of the rubberized asphalt and the adjacent traction layer. By interposing the release sheet, adhesion between subsequent layers of the membrane material is prevented. Of course, during application to a roof surface, the release sheet is removed, thereby allowing the sticky underside of the membrane to adhere to the roof.

One object of the present invention is to provide rubberized asphalt roofing product which can be applied along the eaves of a roof to serve as a water infiltration barrier for the overlying shingles.

Another object of the present invention is to provide a roofing membrane having a non-slip surface for the safety of roof installers.

A further object of the invention is to provide a roofing membrane that will not adhere to shingles, thereby allowing the shingles to be easily removed and replaced, if necessary.

These, and additional features and advantages of present invention, will become more apparent from the following detailed description when taken in conjunction with the accompanying drawings.

DETAILED DESCRIPTION

Figure 1:
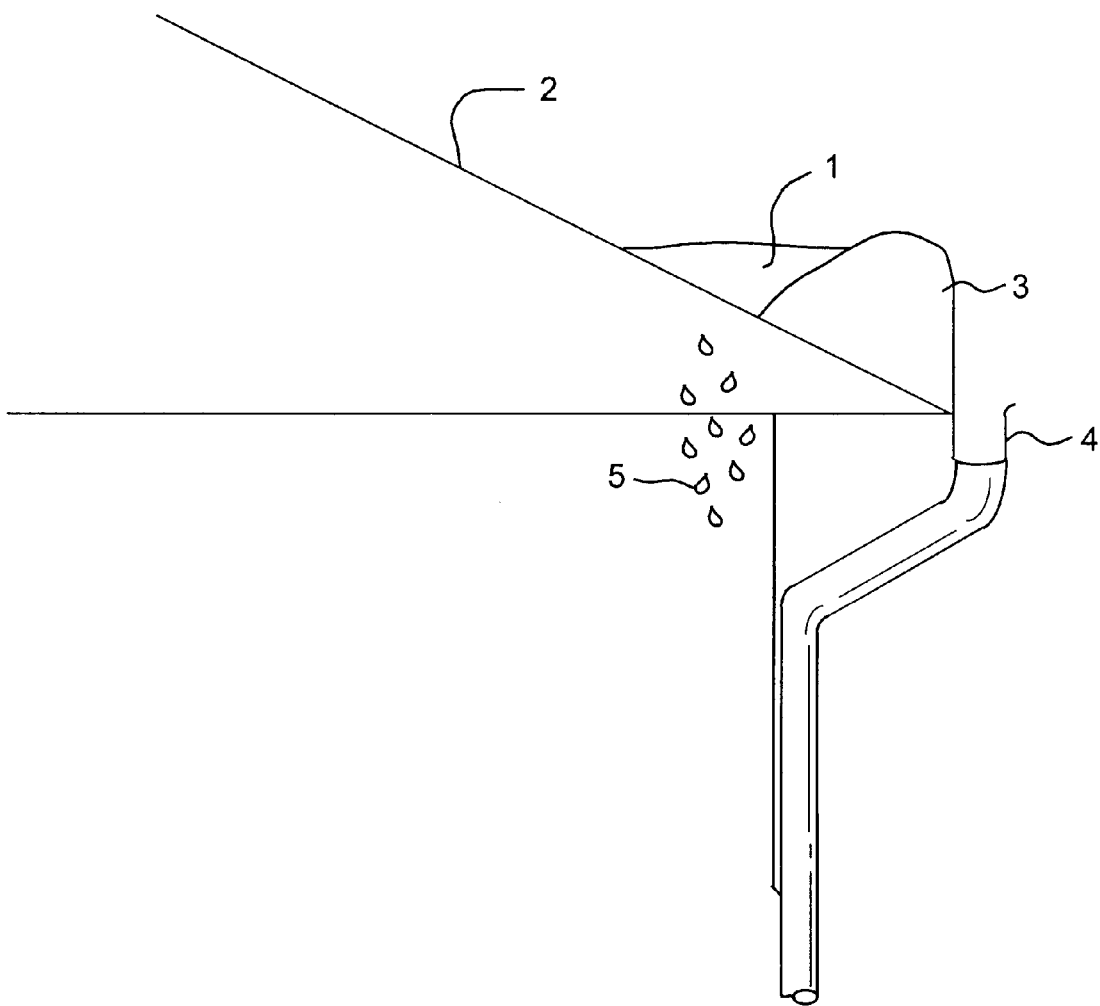
FIG. 1 is a side elevational view of a portion of a roof showing an ice dam.

The present invention relates to self-adhesive membranes which have been developed to eliminate problems associated with ice dams. The inventive membranes have a woven or non-woven fibrous mat which is encapsulated within a relatively non-adhesive asphalt composition. One surface of the coated mat is provided with an acrylic coating which optionally contains finely-ground particles of talc or other mineral materials. The other surface of the encapsulated mat supports a rubberized asphalt layer that adheres directly to the wood deck of a roof. Roof shingles may then be applied directly over the membrane. The membrane prevents water entry into the structure by adhering to the deck and sealing around the nails which are used to hold the shingles to the roof deck. However, since the membrane has been provided with a relatively non-adhesive asphalt upon which is coated an acrylic material, shingles placed against the membrane do not adhere to it, either upon placement or after an extended period of time.

As noted previously, two types of self-adhesive membranes are currently used to solve the ice dam problem: granular surfaced membranes and polyethylene surfaced membranes. Typical polyethylene surfaced products are either embossed or coated to reduce the slip hazard to the roofing installer. Since the roofing installer must stand on the membrane during its application to the roof deck, surface traction on the membrane is a significant safety issue. The present invention increases surface traction on the membrane by providing a high-traction fibrous mat on the upper surface of the membrane. The mat may be high traction by its own nature, or it may be provided with a non-slip coating embedded at least on its surface.

The fibrous mat may be any of a wide variety of woven or non-woven materials. In one preferred embodiment, the fibrous mat comprises a non-woven fiberglass mat. In another preferred embodiment, the fibrous mat comprises a non-woven polyester mat. The mat is preferably saturated with a material which comprises 50% oxidized asphalt and 50% limestone filler, and then coated with a polymeric composition, such as an acrylic composition, and talc. The asphalt coating tends to fill in gaps and porous regions in the mat through which leaks could otherwise occur in sections of the membrane which are lapped. The acrylic provides or enhances a high traction walking surface. In addition, the acrylic acts as a binder to strengthen the membrane. Polymeric strengthening of the membrane is desired because the membrane must meet an ASTM tensile strength requirement of 24 pounds per inch. The strength of the polymer thereby allows a lighter glass mat to be used.

When using a fiberglass mat, a non-woven fiberglass weighing between one to three pounds per hundred square feet (about 0.05–0.15 kg/m$^2$), preferably about two pounds per hundred square feet (about 0.10 kg/m$^2$), is used. The polymeric composition that is applied to the asphalt-saturated mat can be selected from any of a wide variety of polymeric materials. For example, polyurethanes, polyethylenes, latex, ethylene vinyl acetate (EVA), acrylic polymers and polyesters all may be used. In one preferred embodiment, the polymeric composition is a composite of an acrylic and a low molecular weight polyethylene. In another preferred embodiment, the polymer comprises a UV curable polyurethane. In still another preferred embodiment, the encapsulated mat is provided with a coating of polyethylene.

It should be noted, however, that the invention is not intended to be limited to polymeric coated embodiments. Rather, any of a wide variety of fibrous mat materials, including, but not limited to, woven and non-woven polyesters and polypropylenes, with or without polymeric coatings, may be used. For example, in one preferred embodiment, the mat comprises a non-woven polyester, preferably weighing between about 2.22 to about 4.88 pounds per hundred square feet, (about 0.11–0.24 kg/m$^2$) encapsulated in the asphalt composition.

Likewise, the invention is not intended to be strictly limited to embodiments in which the fibrous mat is encapsulated in an asphaltic material. Rather, in one embodiment, the mat may be encapsulated within a polymeric material such as ethylene vinyl acetate (EVA) or a polyurethane. Such an encapsulated mat would still employ the adhesive asphalt layer to adhere the membrane to the roofing deck, and may optionally include the acrylic or similar coating on its upper surface and/or a finely-ground mineral layer such as talc.

In still another embodiment, the membrane comprises a mat formed of a non-woven polymer, such as polyester that has its lower surface coated with a non-adhesive, filled asphalt. An adhesive asphalt is then coated onto the non-adhesive asphalt layer in order to provide a surface which readily adheres to the roofing deck. As before, the non-adhesive filled asphalt preferably comprises a composition of 50% oxidized asphalt and 50% limestone filler. This embodiment does not require a polymeric or finely-ground mineral coating on its upper surface, although, if desired, one or more of those may be employed.

In a broad sense, the present invention comprises a roofing membrane material having a traction layer formed by a fibrous mat encapsulated within a relatively non-adhesive asphalt. The encapsulated mat further includes, on one surface, an adhesive asphalt coating such as that described below. The relatively non-adhesive asphalt material, in one preferred embodiment, comprises an oxidized asphalt and limestone filler. These two components may be present over a wide compositional range, but a ratio of 50% by weight of each is preferred. The mixture of oxidized asphalt and limestone filler is desirable in that it is relatively inexpensive, has excellent high temperature stability due to its Ring and Ball melt point of about 225–250° F. (about 107–121° C.), and helps to create a non-stick, but safe walking surface. This is important because, especially in the case of EVA-coated fiberglass, gaps in the mat may be present. Using a method that will be described in detail below, the relatively non-adhesive asphaltic layer is applied to the fibrous mat in a manner such that it infiltrates completely through the mat's thickness. An acrylic coating is provided on one surface of the encapsulated mat, while an adhesive asphalt layer is provided on the other surface of the encapsulated mat.

The adhesive asphalt coating formed on one side of the encapsulated mat generally comprises a material having from about 0–30% mineral stabilizer, (i.e., powdered limestone), about 5–15% styrene-butadiene copolymer or styrene-butadiene-styrene copolymer, and the balance being flux asphalt having a Ring and Ball softening point of between about 80° F. and about 150° F., (i.e., between about 26.67° C. and about 65.56° C.). Additionally, a tackifying oil, such as Hydrolene may be added. This second layer of material, being adhesive, is used to adhere the membrane to the roof deck.

A release sheet, as described below, can be adhered to the adhesive material to protect the adhesive properties during transport and storage of the membrane.

Figure 2:
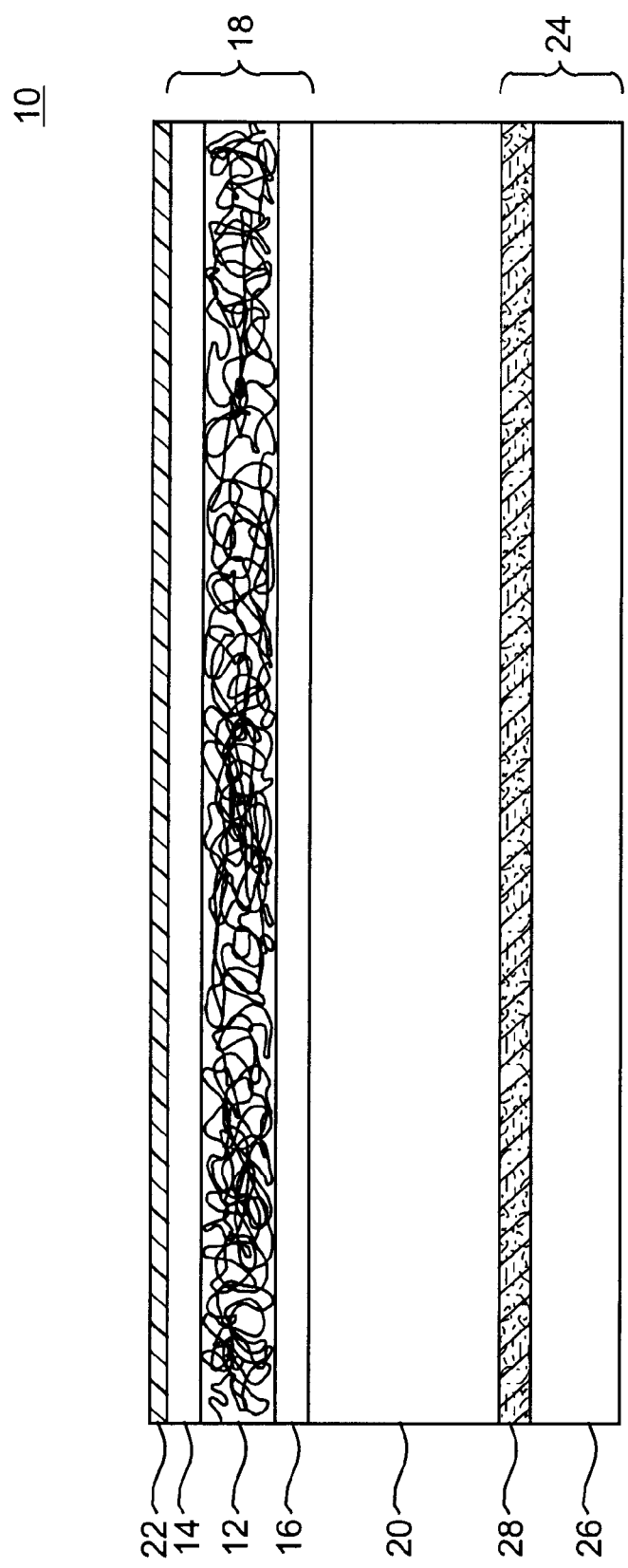
FIG. 2 is a sectional view of the roofing membrane of the present invention.

FIG. 2 depicts a roofing membrane material 10 of the present invention. More particularly, as can be seen in FIG. 2, the roofing membrane material 10 comprises a multilayered structure formed of a fibrous mat 12, encapsulated entirely within a relatively non-adhesive asphalt composition 14, 16, to form an encapsulated mat 18, and an adhesive, rubberized asphalt layer 20 disposed on one surface of the encapsulated fibrous mat 18. An acrylic coating 22 is formed on the other surface of the encapsulated mat. Talc may be applied to the acrylic coating, or granular particles may be embedded therein, to further enhance traction upon the non-adhesive surface.

Optionally, a release sheet 24, such as a paper or plastic film 26 having a siliconized surface 28 can be adhered to the relatively adhesive portion 20 of the membrane 10. The release sheet 24 is removed prior to use of the membrane material to allow the adhesive portion 20 of the membrane to be adhered to a roof surface. The release layer 24 is typically a paper sheet 26 having a siliconized surface 28. As an alternative, the release layer can comprise two separate sheets; a first supporting sheet of a paper or polymeric film, and a second sheet of a low surface energy material. Additionally, in the case of a siliconized paper, the silicon coating may be replaced by some other suitable low surface energy material such as a wax emulsion or a soap solution.

As can also been seen in FIG. 2, the invention is characterized in that the non-adhesive asphalt 14, 16 infiltrates completely through the fibrous mat 12. In so doing, the non-adhesive material serves to seal the mat 12, without detracting from the mat's particular non-slip properties. As noted previously, and especially when formed from fiberglass, a polymeric coating may be applied to the mat to further seal it and to enhance its non-slip characteristics.

The above-described structure addresses many of the needs currently embodied in the roofing industry. For example, the membrane provides a good seal between the decking of the roof surface and the roofing shingles to prevent moisture from penetrating into the roof, even if ice dams are formed on the eaves of the roof. The membrane also elongates and recovers around the nails, thereby providing an excellent seal around nails that pass through the membrane to secure shingles to the decking forming the roof surface. In addition, the fibrous mat 12 serves to provide a non-slip surface to the portion of the membrane material that will be walked upon by roofing installers. This non-slip surface offers the installers greater traction, and thus, greater safety, when installing the roof, even in wet or otherwise slippery conditions. Furthermore, the non-adhesive asphalt and acrylic layers do not stick to shingles that are layered above them, thereby allowing the shingles to be removed and replaced without the need to replace underlying roof decking.

Figure 3:
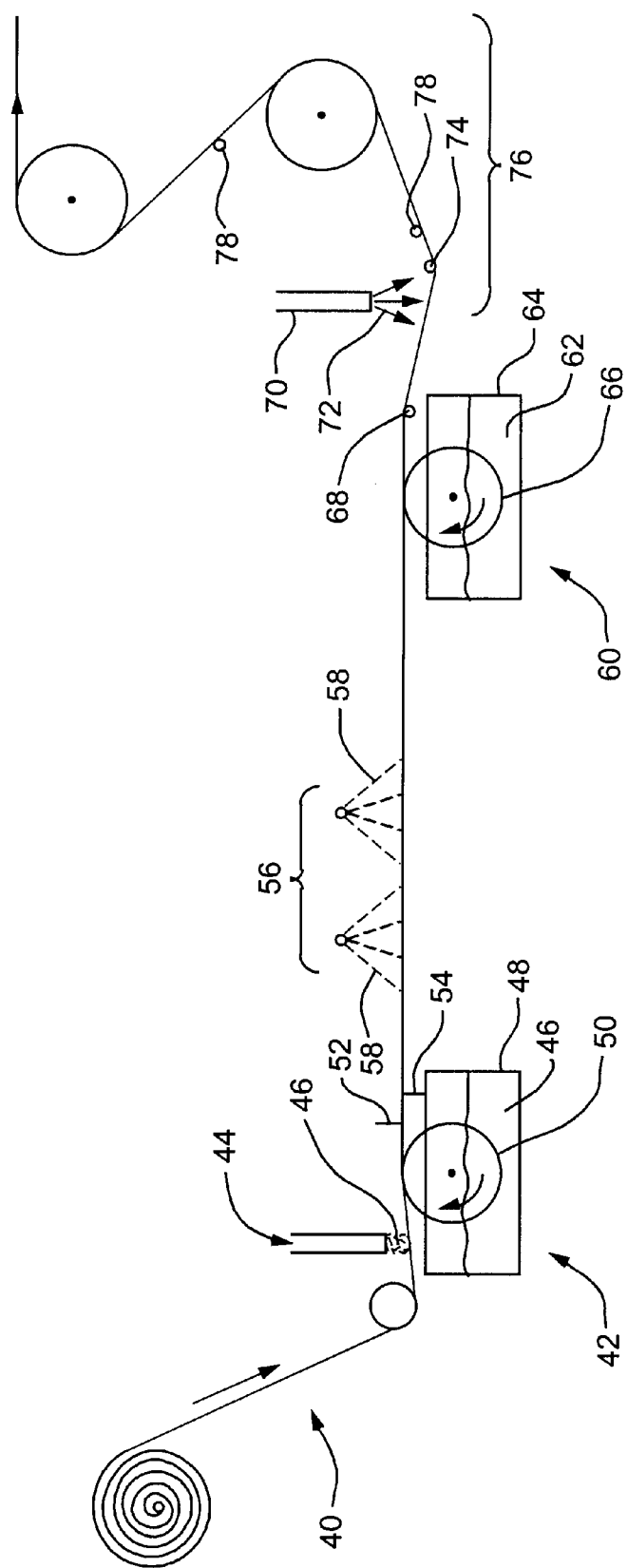
FIG. 3 is a schematic representation of one process for manufacturing the roofing membrane of the present invention.

Membranes of the present invention are made using a continuous, multi-coating process. One embodiment of the process is shown in FIG. 3. In FIG. 3, a web 40 of the fibrous material is passed through several coating stations. The first coating station 42 comprises an asphalt supply pipe 44 which provides an excess of the non-adhesive asphalt material 46 to the upper surface of the web. Excess non-adhesive asphalt material 46 flows over the web and into a first coating bath tank 48. A roller applicator 50 simultaneously applies the non-adhesive asphalt material 46 to the lower surface of the web 40. The coated web is then scraped on its upper surface by an upper doctor blade 52 and on its lower surface by a lower doctor blade 54. The doctor blades serve to maintain the non-adhesive asphalt coating at a predetermined thickness.

Next, the web then passes below one or more acrylic spray heads 56, which spray an aqueous solution 58 of the acrylic coating onto the upper surface of the web. The aqueous acrylic solution is applied immediately after the web passes the first coating station 42. As such the web is still hot, due to the coating of heated asphalt which has just been applied. The heat of the web (preferably about 175° C.) causes the aqueous portion of the aqueous acrylic solution to evaporate, leaving behind the acrylic material. The heat of the web also causes the acrylic material to begin curing.

The web then passes to a second coating bath station 60. In the second coating bath station 60, heated adhesive, rubberized asphalt material 62 is contained in a second coating bath tank 64 and applied to the underside of the web 40 by a roller applicator 66. The thickness of the coating is controlled using a rolling, heated pipe positioned immediately downstream of the roller applicator 66.

As noted previously, an additional coating, such as talc or granular particles may be applied to the upper surface of the membrane. This coating serves to fill gaps where the acrylic may have not fully coated the asphalt surface. In so doing, the talc prevents the membrane material from sticking to itself when rolled. If desired, for example, talc may be applied as follows. A talc supply pipe 70 provides a mixture of talc/water mixture 72 to the upper surface of the web. This material combines with the partially cured acrylic and fills any voids that may be present in the acrylic coating. The talc mixture is metered on the web surface using a silicone-coated rubber roller 74 and one or more air blowers 78 that force excess talc mixture into a catch tray 76. The remaining talc/water mixture dries during subsequent manufacturing steps, leaving a coating of talc on the upper, acrylic surface of the web 40. Applying talc from a water mixture is advantageous in that the water portion of the mixture is a convenient, low cost carrier for the talc, which also serves to cool the acrylic coating to prevent it from sticking to the process machinery during manufacture. It is additionally advantageous since the web must be cooled prior to the application of the release sheet (not shown) to the lower surface of the web.

The release sheet can be applied by any of a wide variety of methods known to those skilled in the art of web handling and processing. It is noted that the present invention is not intended to be limited to the particular method described above. This method has been described for illustration purposes, however, it should be understood that many other methods for forming the inventive membrane may be available to those of ordinary skill in the art.

The resulting membrane product comprises a fibrous mat encapsulated within a non-adhesive asphalt material. The encapsulated mat will have an adhesive asphalt affixed to its lower surface, and an acrylic layer affixed to its upper surface. Talc or particulate granules may optionally be deposited on or in the acrylic layer. To aid in shipping, storing and handling the membrane, a release sheet may be applied to the adhesive asphalt layer.

Figure 4:
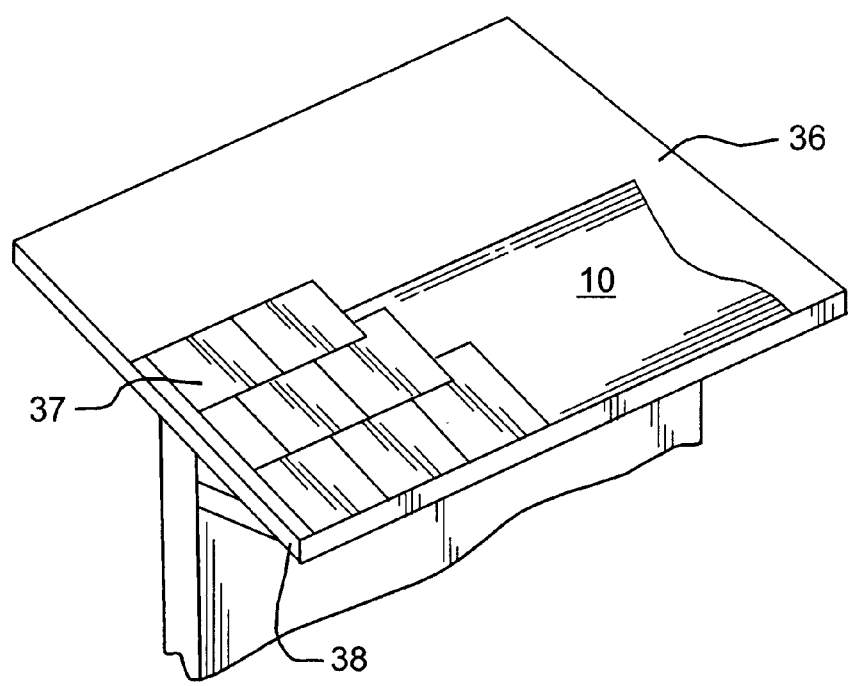
FIG. 4 is a perspective view of the eaves of a roof having the membrane of the present invention, and several shingles, applied thereto.
Figure 5:
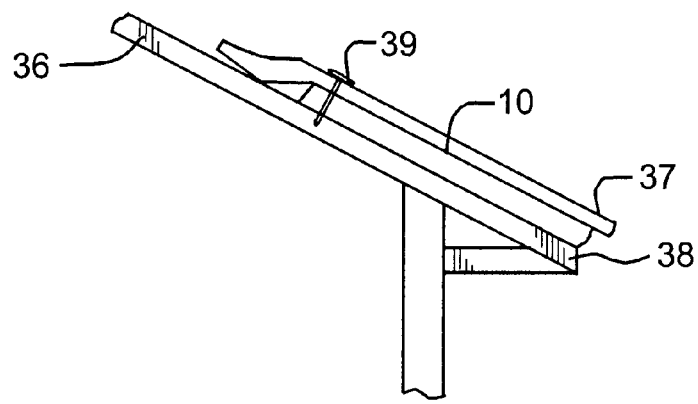
FIG. 5 is a side elevational view of the portion of the roof shown in FIG. 4, with the shingles removed for the purpose of clarity.

FIGS. 4 and 5 show the manner in which the membrane material 10 is intended for use on a roof deck 36 in the region of the roof eaves 38. In applying the present invention, eaves flashing is replaced by the membrane 10 described herein. In use, the release sheet 24 is removed from the lower surface of the double asphaltic layer 1 8, and the membrane 10 is secured to the roof deck 36 by adhesive action. The membrane 10 is positioned along the leading edge of the roof. Subsequently, a first row of shingles 37 is positioned in an overlying relationship to the membrane 10. The shingles are secured in place using nails 39. Although the roofing installer will often be caused to stand on the membrane during installation of the shingles, the fibrous mat of the inventive membrane 10 provides sufficient friction to minimize the likelihood of slipping. Thus, as compared to many of the known roofing membranes, the membranes of the present invention provide a safer work surface.

EQUIVALENTS

From the foregoing detailed description of the specific embodiments of the invention, it should be apparent that a unique roofing membrane material has been described.

Although particular embodiments have been disclosed herein in detail, this has been done by way of example for purposes of illustration only, and is not intended to be limiting with respect to the scope of the appended claims which follow. In particular, it is contemplated by the inventor that various substitutions, alterations, and modifications may be made to the invention without departing from the spirit and scope of the invention as defined by the claims.

What is claimed is:

1. A roofing membrane material which comprises:
    a) a fibrous mat having an upper surface and a lower surface;
    b) a non-adhesive asphalt coating comprising an oxidized asphalt and a filler material which encapsulates the fibrous mat; and
    c) an adhesive asphalt coating applied to the lower surface of the encapsulated mat.

2. The roofing membrane material of claim 1 wherein the fibrous mat comprises a non-woven fibrous mat.

3. The roofing membrane material of claim 1 wherein the fibrous mat comprises fibers selected from the group consisting of polyesters, polypropylenes and fiberglass.

4. The roofing membrane material of claim 1 wherein the encapsulated fibrous mat further includes a polymeric coating on at least a portion of the upper surface.

5. The roofing membrane material of claim 4 wherein the polymeric coating is provided with a coating of a finely-ground mineral.

6. The roofing membrane material of claim 5 wherein the finely-ground mineral comprises talc.

7. The roofing membrane material of claim 4 wherein the polymeric coating is selected from the group consisting of ethylene vinyl acetate, polyurethanes, polyethylenes, latex, acrylic polymers and polyesters.

8. The roofing membrane material of claim 1 which further includes a release sheet adhered to the adhesive asphalt coating.

9. The roofing membrane material of claim 1 wherein the filler material comprises limestone filler.

10. The roofing membrane material of claim 1 wherein the adhesive asphalt coating comprises, in combination:
    a) a flux asphalt;
    b) a filler material;
    c) a material selected from the group consisting of styrene-butadiene copolymers and styrene-butadiene-styrene copolymers; and
    d) a tackifying oil.

11. The roofing membrane material of claim 10 wherein the filler material comprises limestone filler.

12. A roofing membrane material which comprises:
    a) a fibrous mat having an upper surface and a lower surface;
    b) a non-adhesive polymeric coating which encapsulates the fibrous mat; and
    c) an adhesive asphalt coating applied to the lower surface of the encapsulated mat.

13. The roofing membrane of claim 12 wherein the non-adhesive polymeric coating is selected from the group consisting of ethylene vinyl acetate and polyurethane.

14. A roofing membrane material which comprises:
    a) a polymeric fibrous mat having an upper surface and a lower surface;
    b) a non-adhesive asphalt coating comprising an oxidized asphalt and a filler material which encapsulates the fibrous mat; and c) an adhesive asphalt coating applied to the lower surface of the encapsulated mat.

15. The roofing membrane of claim 14, wherein the polymeric fibrous mat comprises a non-woven polyester mat.

16. The roofing membrane material of claim 14 wherein the adhesive asphalt coating comprises, in combination:
   a) a flux asphalt;
   b) a filler material;
   c) a material selected from the group consisting of styrene-butadiene copolymers and styrene-butadiene-styrene copolymers; and
   d) a tackifying oil.

17. The roofing membrane of claim 12 wherein said non-adhesive polymeric coating includes a finely-ground mineral.

18. The roofing membrane of claim 17 wherein said finely-ground mineral comprises talc.

19. The roofing membrane of claim 14 further including a polymeric coating with a finely-ground mineral on at least a portion of the upper surface of said fibrous mat.

20. The roofing membrane of claim 19 wherein said polymeric coating includes acrylic polymers and wherein said finely ground mineral includes talc.

* * * * *